US009318153B2

(12) United States Patent
Trantham et al.

(10) Patent No.: US 9,318,153 B2
(45) Date of Patent: Apr. 19, 2016

(54) HAMR DRIVE FAULT DETECTION SYSTEM

(71) Applicant: Seagate Technology LLC, Cupertino, CA (US)

(72) Inventors: Jon D. Trantham, Chanhassen, MN (US); Robert Matousek, Berthoud, CO (US); Todd M. Lammers, Lafayette, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/230,367

(22) Filed: Mar. 31, 2014

(65) Prior Publication Data
US 2015/0279430 A1 Oct. 1, 2015

(51) Int. Cl.
| G11B 5/02 | (2006.01) |
| G11B 11/00 | (2006.01) |
| G11B 27/36 | (2006.01) |
| G11B 13/08 | (2006.01) |
| G11B 13/04 | (2006.01) |
| G11B 11/105 | (2006.01) |
| G11B 5/48 | (2006.01) |
| G11B 5/31 | (2006.01) |
| G11B 5/60 | (2006.01) |
| G11B 5/00 | (2006.01) |

(52) U.S. Cl.
CPC ............... *G11B 27/36* (2013.01); *G11B 5/314* (2013.01); *G11B 5/4866* (2013.01); *G11B 5/6088* (2013.01); *G11B 11/10504* (2013.01); *G11B 11/10506* (2013.01); *G11B 13/04* (2013.01); *G11B 13/08* (2013.01); *G11B 2005/0021* (2013.01)

(58) Field of Classification Search
None
See application file for complete search history.

(56) References Cited

U.S. PATENT DOCUMENTS

| 4,685,097 | A | | 8/1987 | van der Put | |
| 4,809,091 | A | | 2/1989 | Miyazawa et al. | |
| 5,042,023 | A | * | 8/1991 | Yokota | G11B 7/0045 347/257 |
| 5,828,583 | A | | 10/1998 | Bush et al. | |
| 6,643,081 | B1 | | 11/2003 | Walker et al. | |
| 6,982,842 | B2 | | 1/2006 | Jing et al. | |
| 7,304,816 | B2 | | 12/2007 | Johnson et al. | |
| 7,382,562 | B2 | * | 6/2008 | Emo | G11B 5/40 360/46 |
| 7,743,989 | B2 | | 6/2010 | Gurevich et al. | |
| 7,864,474 | B2 | | 1/2011 | Satoh et al. | |
| 7,952,827 | B2 | * | 5/2011 | Ohta | G11B 5/1278 360/125.02 |
| 8,289,821 | B1 | * | 10/2012 | Huber | G11B 5/02 369/30.03 |
| 8,315,128 | B1 | * | 11/2012 | Wilson | G11B 5/02 369/13.02 |
| 8,537,644 | B2 | * | 9/2013 | Lennard | G11B 5/02 369/116 |

(Continued)

FOREIGN PATENT DOCUMENTS

WO    WO2011101917    8/2011

OTHER PUBLICATIONS

Feb. 24, 2015, File History for U.S. Appl. No. 14/511,756.

(Continued)

*Primary Examiner* — Dismery Mercedes
(74) *Attorney, Agent, or Firm* — Hollingsworth Davis, LLC

(57) ABSTRACT

A data storage apparatus includes a controller capable of being coupled to a read/write head. The controller is configured to receive a fault signal from a sensor of the read/write head. The sensor indicates whether an energy source used to heat the recording medium is malfunctioning during a write operation. In response to the fault signal, the controller takes remedial action to protect the data associated with the write operation.

12 Claims, 5 Drawing Sheets

(56) References Cited

U.S. PATENT DOCUMENTS

| | | |
|---|---|---|
| 8,559,815 B2 | 10/2013 | Iizuka et al. |
| 8,810,953 B2 * | 8/2014 | Okada ............... G11B 5/02 360/75 |
| 8,854,929 B1 | 10/2014 | Champion et al. |
| 8,854,930 B1 * | 10/2014 | Clinton ............ G11B 7/1263 360/125.32 |
| 2003/0007279 A1 | 1/2003 | Johnson et al. |
| 2004/0027728 A1 * | 2/2004 | Coffey ............... G11B 5/012 360/313 |
| 2005/0213436 A1 * | 9/2005 | Ono ................. G11B 5/3133 369/13.02 |
| 2009/0161243 A1 | 6/2009 | Sharma et al. |
| 2009/0225464 A1 * | 9/2009 | Juang et al. ............ 360/59 |
| 2009/0296257 A1 * | 12/2009 | Nakano ............... G11B 5/09 360/71 |
| 2010/0211335 A1 | 8/2010 | Gokita |
| 2011/0205861 A1 * | 8/2011 | Erden ............... G11B 5/02 369/13.27 |
| 2012/0243390 A1 * | 9/2012 | Lennard ............ G11B 5/02 369/13.24 |
| 2013/0058368 A1 * | 3/2013 | Dean ............... H01S 5/0427 372/38.02 |
| 2013/0077453 A1 * | 3/2013 | Alex ................. G11B 5/02 369/13.26 |
| 2014/0119164 A1 * | 5/2014 | Wilson ............... G11B 5/314 369/13.32 |
| 2014/0168809 A1 * | 6/2014 | Wilson et al. ............ 360/46 |

OTHER PUBLICATIONS

Jun. 3, 2015, File History for U.S. Appl. No. 14/511,756.

* cited by examiner

HAMR DRIVE FAULT DETECTION SYSTEM

SUMMARY

A data storage apparatus according to various embodiments described within the present disclosure includes a controller capable of being coupled to a read/write head. The controller is configured to receive a fault signal from a sensor of the read/write head. The sensor indicates whether an energy source used to heat the recording medium is malfunctioning during a write operation. In response to the fault signal, the controller takes remedial action to protect the data associated with the write operation.

A system according to various embodiments described within the present disclosure includes a read/write head and a controller. The read/write head includes an energy source that is used to heat a recording medium and a sensor that is configured to detect whether the energy source is heating the recording medium during a write operation. The controller is coupled to the read/write head and receives a fault signal from the sensor indicating that the energy source is malfunctioning during the write operation. In response to the fault signal, the controller takes remedial action to protect the data associated with the write operation.

A method according to various embodiments described within the present disclosure includes initiating a write operation of data onto a recording medium, sensing whether the recording medium is heated during the write operation, issuing a fault signal if the recording medium is not heated during the operation, and responding to the fault signal by protecting the data associated with the write operation.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In heat-assisted magnetic recording (HAMR) disk drives, also referred to as thermal-assisted magnetic recording (TAMR) disk drives, heat energy is used in conjunction with magnetic fields applied to a magnetic recording media, e.g., a hard disk drive, to overcome super-paramagnetic effects that limit the areal data density of traditional magnetic media. In a HAMR recording device, information bits are recorded on a storage layer at elevated temperatures. The heated area in the storage layer determines the data bit dimension and linear recording density is determined by the magnetic transitions between the data bits.

Figure 1:
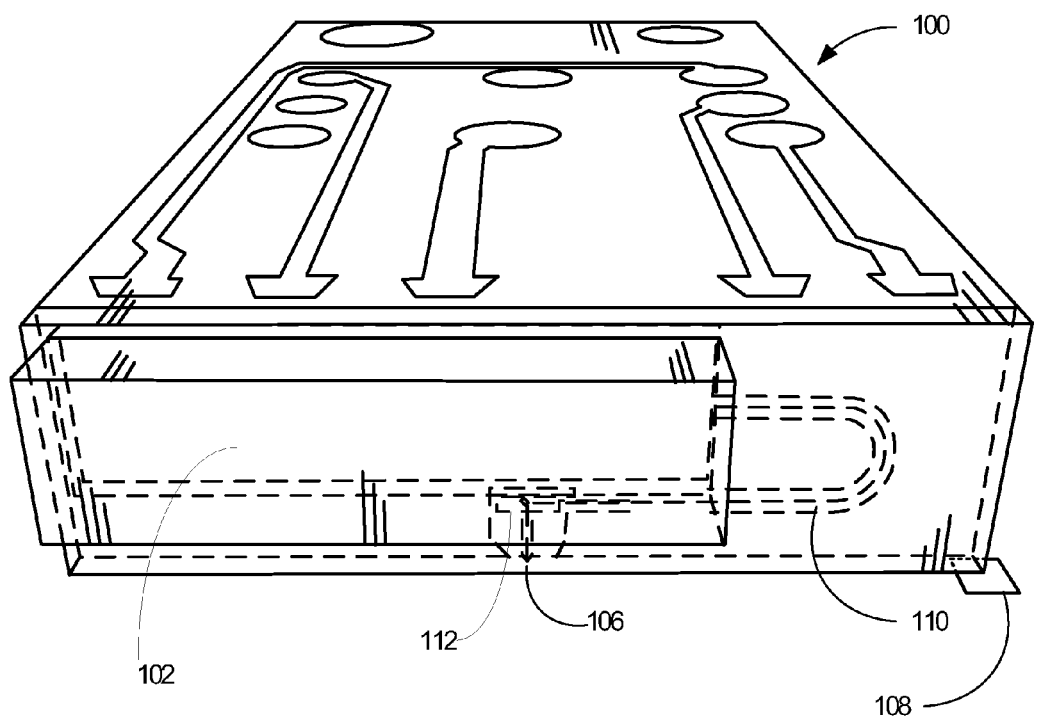
FIG. 1 depicts an example of a HAMR slider.

In order to achieve desired data density, a HAMR recording head, also known as a HAMR slider, includes optical components that direct, concentrate and transform light energy from an energy source to heat on the recording media. An example configuration of a HAMR slider is depicted in FIG. 1. The HAMR slider 100 includes an energy source 102, e.g., a laser diode, configured to produce laser light that energizes an optical antenna 112 of a near field transducer (NFT) 106. The laser light produced by the energy source 102 is guided to the NFT 106 through an optical waveguide 110. The head media interface (HMI), also known as an air bearing surface (ABS) is indicated with item number 108.

Figure 2:
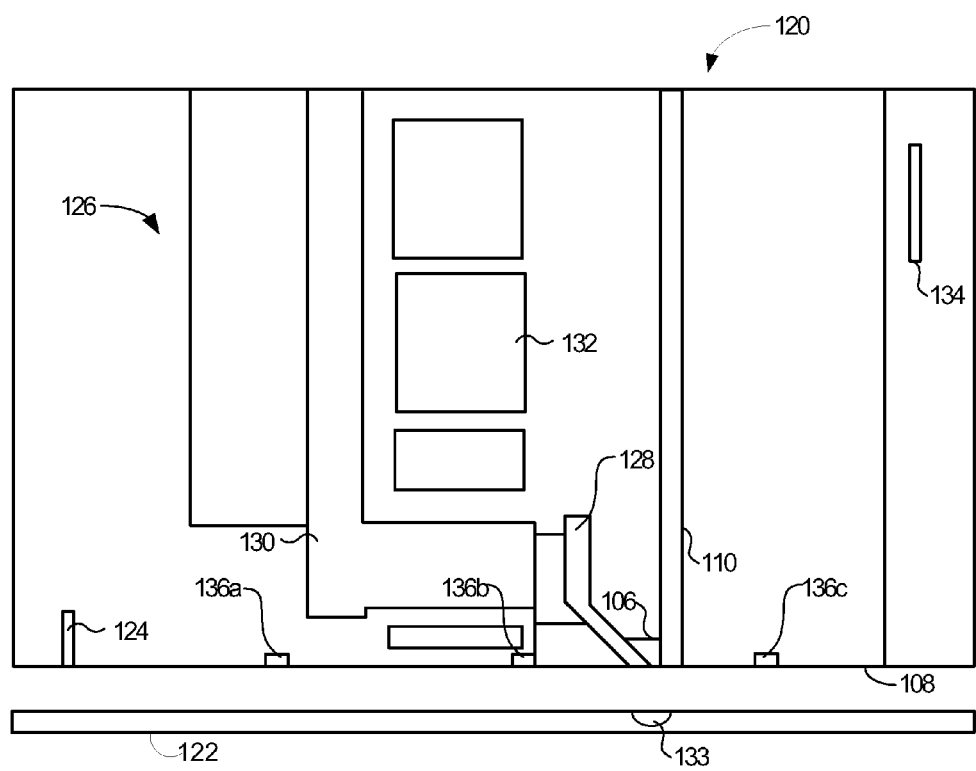
FIG. 2 depicts an example of a read/write head configuration.

A detailed view of an exemplary read/write head configuration 120 contained within HAMR slider 100 is provided in FIG. 2. The read/write head configuration 120 is positioned with ABS 108 proximate magnetic medium 122. The read/write head configuration 120 includes a magnetic read head 124 proximate the ABS 108 for reading data from the magnetic medium 122 and a magnetic writer configuration 126 for writing to the magnetic medium 122. The magnetic writer configuration 126 includes NFT 106 intermediate optical waveguide 110 and write pole 128 and write coil 132. A hotspot 133 created by the heat emitted by NFT 106 is shown within magnetic medium 122. The read/write head configuration 120 also includes a heater 134 and may also include at least one sensor. For purposes of illustration, sensors 136a, 136b, and 136c are shown; the multitude of sensors indicating possible placement locations within the read/write head configuration 120.

Sensors 136a, 136b, and 136c may comprise any variety of sensors including a sensor having a temperature coefficient of resistance (TCR), a varistor, or a thermocouple, for example. One example of a TCR sensor is a dual-ended temperature coefficient of resistance sensor (DETCR). A TCR sensor measures temperature change by measuring the change in resistance, or rate of change of resistance, across the sensor and, as such, can measure the temperature change at the ABS 108 induced by all thermal condition changes from air pressure, clearance, head operation, and contact, among other changes. As described, a TCR sensor may be used to monitor temperature in the HAMR slider 100 but it may also be used during manufacturing to set head-disk spacing and/or may be used for thermal asperity (TA) detection.

Sensors 136a, 136b, and 136c may alternatively, and/or additionally, comprise any variety of sensors including a light output detection sensor such as a photodiode, phototransistor or bolometer. The light output detection sensor may be used to measure the light output of the energy source 102, e.g., laser diode, as a feedback mechanism for regulating the output power of the energy source 102.

The locations of sensors 136a, 136b, and 136c in FIG. 2 represent possible locations for a sensor. Other sensor locations may be used as desired or appropriate. For example, the photodiode may be located proximate to the laser diode in order to reduce the complexity of recording head manufacturing. Further, the read/write head configuration 120 need not be limited to a single sensor or a single type of sensor rather multiple sensors and multiple sensor types may be used as desired or appropriate. A read/write head configuration 120 with no sensors is also contemplated and may be suitable as per a specific application.

Figure 3:
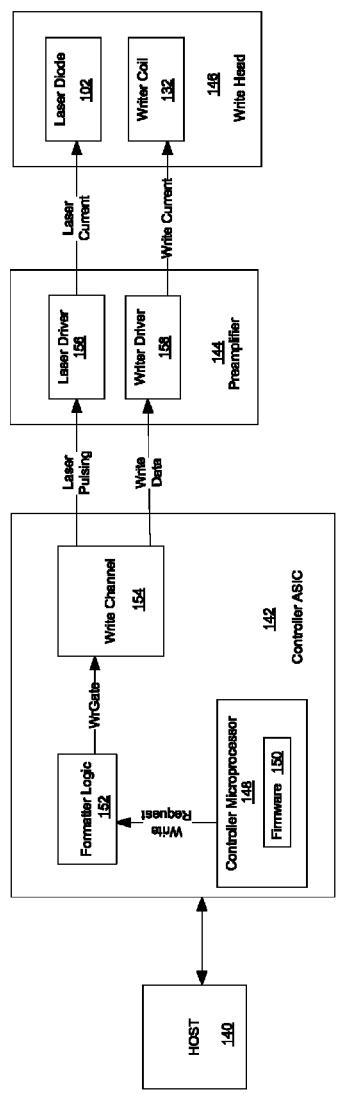
FIG. 3 is a block diagram illustrating an example of components used in a write operation.

Referring now to FIG. 3, a block diagram provides an example of the typical components used by a HAMR drive during a write operation. The components include a host 140, a controller application-specific integrated circuit (ASIC) 142, a preamplifier 144 and a write head 146. The host 140 may comprise a computer or other similar device capable of performing a sequence of logical operations, and may be coupled to the HAMR device via host protocols such as SATA, SaS, SCSI, etc. The controller ASIC 142 generally includes a controller microprocessor 148 operating under control of firmware 150, a formatter 152 utilizing formatter logic and a write channel 154. The preamplifier 144 includes a laser driver 156 and writer driver 158 while the write head 146 includes laser diode 102 (see FIG. 1) and writer coil 132 (see FIG. 2). Often, the drive contains more than one write head, and the preamplifier contains multiplexing circuitry (not shown) for selecting and routing signals to a desired head. Other embodiments include more than one preamplifier.

In operation, the host 140 initiates a write operation that is communicated to the controller ASIC 142 and specifically to the controller microprocessor 148. The controller microprocessor 148 has been programmed, via the firmware 150, to operate on the host instruction and generate a write request to the formatter 152 as well as seek a desired track/position on the magnetic media 122 (see FIG. 2). The formatter 152 asserts the WrGate signal to the write channel 154 which enables the laser driver 156 and writer driver 158 of the preamplifier 144. In this instance, the write channel 154 provides a laser pulsing signal to the laser driver 156 and the write data is provided to the write driver 158. The current from each of the drivers 156 and 158 activates the laser diode 102 and writer coil 132, respectively, allowing the write head 146 to complete the write operation.

HAMR drive technology has increased the speed at which data may be recorded in a magnetic media as well as the amount of data that may be recorded in a magnetic media however the technology does present some complexities. For example, the HAMR media hotspot may need to be smaller than a half-wavelength of light available from economic sources, e.g., laser diodes. Due to what is known as the diffraction limit, optical components cannot focus the light at this scale. One way to achieve tiny confined hotspots that are smaller than the half-wavelength of light is to use an NFT, such as a plasmonic optical antenna. The NFT is designed to have a surface plasmonic resonance when energized by laser light. At resonance, a high electrical field surrounds the NFT due to the collective oscillation of electrons in the metal. Part of the electrical field tunnels into the magnetic media and is absorbed, raising the temperature of the magnetic media locally above the Curie point for recording. Without the presence of heat energy, the magnetic media will be below the Curie point, and no effective erasure or re-magnetization will occur, even if the magnetic field from the writer is present. However, it is well understood that the magnetic transitions are defined, i.e., magnetically frozen, at temperatures less than the Curie temperature.

Furthermore, while a HAMR drive may use a laser and an NFT to heat the media to aid in the recording process, inefficiencies in the optical transmission path, the laser and the NFT can result in the heating of the overall HAMR head/slider. The heating may originate from the NFT, the light delivery optics and/or from the laser itself. Energy absorbed into these components may be converted to heat, which is conducted to the surrounding materials. This heat can be detected by sensor(s) within the recording head, for example the DETCR sensor(s) described earlier.

Additionally, in some HAMR drive embodiments a technique known as pulsing may be used to control the laser, such a technique was utilized in the configuration of FIG. 3. The pulsing operates to flash the laser at a repetitive frequency. Pulsing is usually in synchronization with magnetic transitions from the writer coil, but offset in phase such that the flashes occur between magnetic transitions. The support of pulsing adds control pins and circuitry within the preamplifier, which add additional, potential failure points.

Because of the technical complexities involved in HAMR drives, such as those described above, errors in the writing of data to magnetic media can occur. However, in disk drives, especially in "enterprise disk drives", i.e., drives that are commonly used in industry and commerce, data integrity is given a high priority. In the general sense, disk drive data integrity means returning the same data when read as what was most recently written or, alternatively, returning an error indication that the drive was unable to complete a valid data write, which might occur, for example, on a hardware error or other drive system error. The error indication would thus suggest a data storage failure mode, and the host system would then perform appropriate error recovery. In this disclosure, when it is written "protect data associated with a write operation", it is meant that either the device has verified the data were properly stored (i.e. by either the lack of a fault detection on a write operation or by performing a read-after-write), or that the host has been notified of the data storage device's failure to properly store the data.

One class of data-integrity failure modes that may occur is that of an "undetected data miscompare." One class of "undetected data miscompares" is a "stale-data miscompare," which can occur when the drive fails to write data to the magnetic media due to some fault, and this failure to write is undetected by the drive. In some failure-mode scenarios, the disk drive accepts data from a host for writing on the magnetic media, but fails to write the data on the magnetic media and, even worse, fails to notify the host system of the failure to write the data on the media. Consequently, when the host later wishes to retrieve (read) the data, the drive reads old (stale) data from an earlier write and returns this data to the host, again failing to notify the host system of the error. This failure mode can even occur in the presence of logical block address (LBA) seeded error detecting codes, since the LBA number of the previously written data is usually the same as the LBA number of the data that was intended to be written.

In conventional disk drives, i.e., non-HAMR drives, a preamplifier containing fault detection circuitry is typically connected to the drive recording head to help prevent the above-described types of failures. Such a preamplifier can detect faults like an open or short-circuited writer element. If the preamplifier detects one of these faults, the preamplifier asserts a signal back to the disk drive controller and the controller performs error recovery, which can include reporting the error to the host if the drive is unable to correct the fault condition. However, fault detection in conventional disk drives does not contemplate detection of faults related to heat or an energy source.

Figure 4:
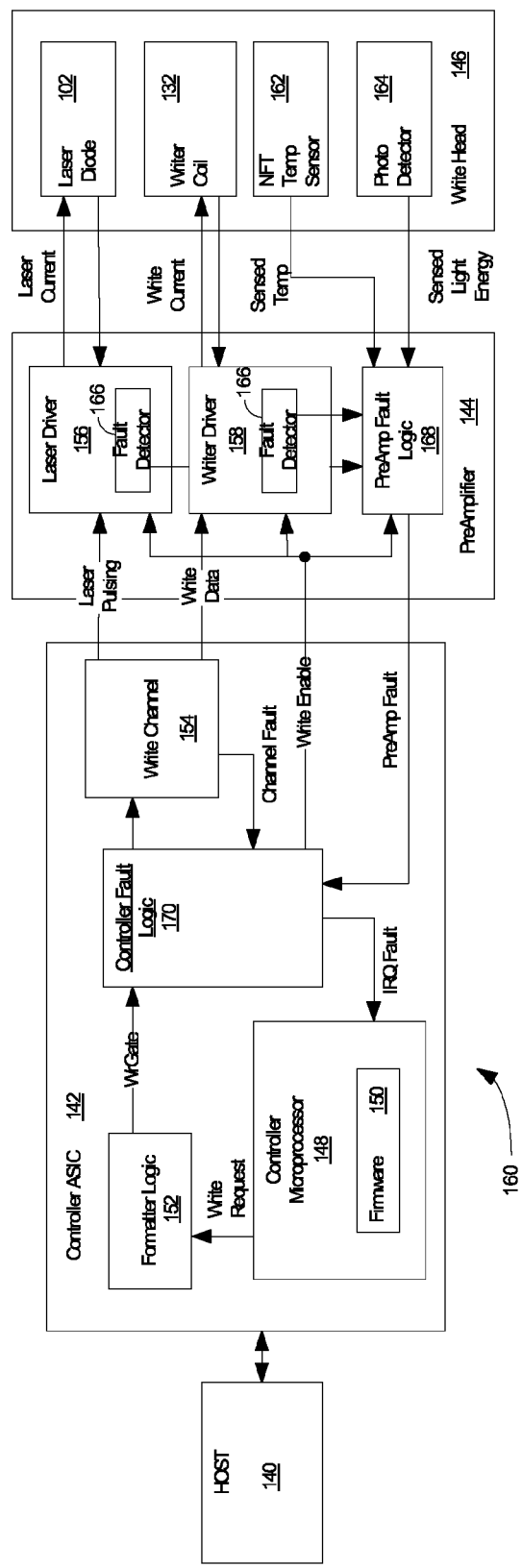
FIG. 4 is a block diagram of a fault detection system according to various embodiments.

FIG. 4 illustrates a fault detection system 160 for a HAMR disk drive. The fault detection system 160 has the ability to detect faults within the energy delivery system of the HAMR drive, including the NFT, which until the present system has not been reliably performed. The inability to detect faults within the NFT may lead to either compromising data integrity or a loss of performance. The fault detection system 160 provides multiple feedback loops that, when disturbed, alerts the controller ASIC 142 to a fault. The controller ASIC 142 contains logic for mitigating the error or reporting an error status back to the host 140 in event of a hard failure. An example of error mitigation includes retrying a write operation with read verification (read after write); other mitigation techniques may be utilized as appropriate.

The fault detection system 160 can interact with host 140, and incorporates those components described above with reference to the write operation block diagram of FIG. 3 including a controller ASIC 142 incorporating a controller microprocessor 148 with firmware 150, a formatter 152 and a write channel 154, a preamplifier 144 incorporating a laser driver 156 and a writer driver 158, and a write head 146 incorporating laser diode 102 and writer coil 132. The fault detection system 160 additionally includes an NFT temperature sensor 162, e.g., DETCR sensor, and/or a photo detector sensor 164 (see FIG. 2 and description relating to corresponding sensors 136a, 136b, and 136c). The fault detection system 160 further includes a fault detector 166 in each of laser driver 156 and writer driver 158 as well as preamplifier fault logic 168 and controller fault logic 170 within controller ASIC 142.

The additional components within fault detection system 160 provide the opportunity for feedback signals that assist in enabling the fault detection. Specifically, the laser diode 102 now provides a feedback current and/or voltage that can be measured by the preamplifier and acted upon by the preamplifier fault logic 168 and/or the controller fault logic. For example, if the laser diode voltage is out of range, if there is a laser diode voltage shift during write indicating mode hopping, if the laser threshold/bias current is out of range, i.e., too high or too low, or if the laser operating current is out of range, i.e., too high or too low, faults within system 160 can be signaled and responded to appropriately. The writer coil 132 similarly provides a feedback current and/or voltage for fault detection.

The NFT temperature sensor 162 and/or photo detector 164 positioned within the write head 146 each provide a signal back to the preamplifier 144 which can be acted upon by the preamplifier fault logic 168 and/or controller fault logic 170. For example, if the NFT temperature sensor 162 detects no or insufficient thermal heating, if the photo sensor 164 indicates the detected light is out of range, i.e., too high or too low, or if the photo sensor 164 indicates that the detected light has a step discontinuity, i.e., faults can be signaled within system 160 and responded to appropriately. Faults within the write head 146 and those occurring in the preamplifier itself are signaled to the preamplifier fault logic 168 and fed back to the controller fault logic 170. Fault feedback signals within the controller ASIC itself are provided from the write channel 154 to the controller fault logic 170. The controller fault logic 170 additionally provides a write enable signal to each of the elements of the preamplifier 144 including the laser driver 156, the writer driver 158 and the preamplifier fault logic 168. The write enable signal generally follows the WrGate signal from the formatter logic 152, asserting when a write is active. Upon reception of a fault, the fault logic 170 aborts the write operation by de-asserting the write enable signal and alerts the controller microprocessor 148 of the fault condition via processor interrupt signal IRQ Fault. The controller microprocessor 148 then performs fault error recovery, which may include rewriting the data and rereading the data to confirm that it was correctly written.

A listing of the faults monitored by the fault detection system 160 and the resulting system failure modes are provided in Table 1. The list of faults in Table 1 should not be deemed exhaustive but rather a listing of exemplary faults to which other faults may be added or subtracted.

TABLE 1

| Monitored Faults | Failure Mode |
| --- | --- |
| 1. Monitor DETCR heating during write; Fault if thermal heating is not detected | Laser Diode Failure |
| 2. Monitor photodiode feedback during write; Fault if out of range | Laser Diode Failure Optical Waveguide Failure Preamp Laser Driver Failure |
| 3. Monitor photodiode feedback during write; Fault if step discontinuity is detected | Mode Hopping Failure |
| 4. Fault if no laser pulsings are received when write transitions or over time period | Pulsing Control Signal Failure (write without laser) |
| 5. Laser diode open Fault | Laser Diode Failure Interconnection Failure |
| 6. Laser diode shorted Fault | Laser Diode Failure Interconnection Failure |
| 7. Laser diode shorted to ground Fault | Laser Diode Failure Interconnection Failure |
| 8. Laser diode forward voltage out of range Fault | Laser Diode Failure Interconnection Failure |
| 9. Laser diode forward voltage shift during write Fault | Mode Hopping Failure |
| 10. Laser threshold/bias current register out of range Fault | Firmware bug Microprocessor Malfunction Communication Error |
| 11. Laser $I_{add}$ ($I_{op}$) current register out of range Fault | Firmware bug Microprocessor Malfunction Communication Error |
| 12. Write without laser enable Fault | Firmware bug Microprocessor Malfunction Communication Error |

Figure 5:
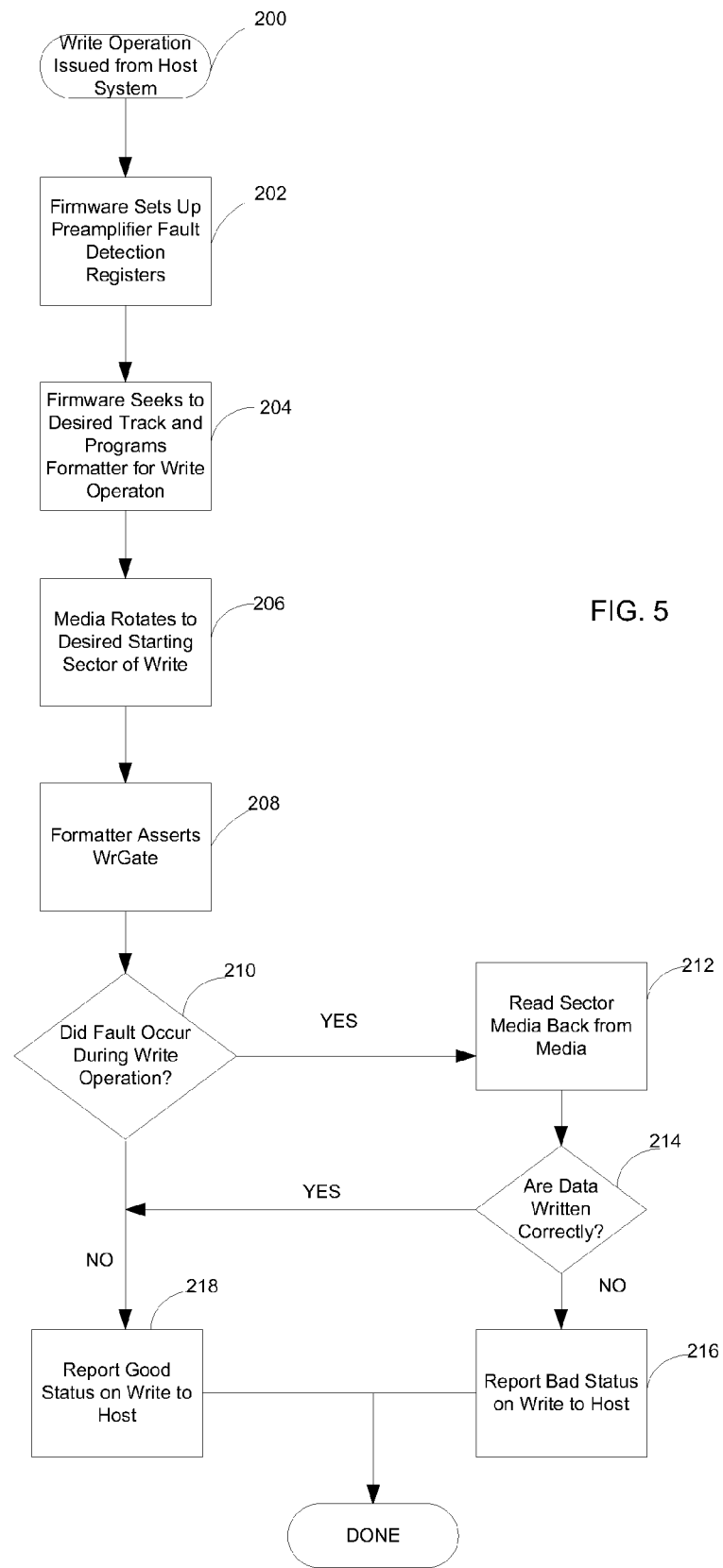
FIG. 5 is a flowchart illustrating a write operation enhanced with a fault detection system according to various embodiments.

Referring now to FIG. 5, a flowchart illustrates an example embodiment of the write operation with the fault detection system 160 implemented. Initially, a write operation is issued from the host, per block 200. The firmware within the controller microprocessor sets up the preamplifier fault detection registers, per block 202. The firmware seeks to a desired track on the magnetic media and programs the formatter for the write operation, per block 204. The magnetic media rotates to the desired starting sector of the write, per block 206. The formatter asserts the write gate, per block 208. The question of whether a fault occurred during the write operation is posed, per decision block 210. If a fault has occurred, as detected by the fault detection system 160, the data on the magnetic media sector is read back, per block 212. The question of whether the data was written correctly is posed, per decision block 214. If the data has not been written correctly (or has not been written at all), a "bad" status on the write is reported to the host, per block 216. If no fault occurred during the write operation or the data was written correctly even though a fault occurred, a "good" status on the write is reported to the host, per block 218. Not shown, additional error recovery steps, for example reprogramming preamplifier registers, rewriting data multiple times, adjusting laser current, etc. may be attempted prior to returning status to the host.

Additional and/or alternative features of the above-described HAMR drive fault detection system 160 include the ability set and adjust operational threshold windows during operation of the drive, e.g., programmable time and amplitude constants for threshold detectors. The sliding window capability allows for temperature, laser power, currents, etc., to change over time without needlessly triggering the fault system. Another feature includes gradual adaptation of fault windows to accommodate for component aging but only if read reads after writes confirm the writes were successful.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. An apparatus, comprising:
a controller capable of being coupled to a read/write head;
an energy source configured to heat a recording medium during a write operation; and
a preamplifier coupled to the controller and the energy source, the preamplifier configured to detect an electrical fault of the energy source and in response thereto provide a fault signal to the controller, wherein the controller is configured to take remedial action comprising protecting data associated with the write operation in response the fault signal.

2. The apparatus of claim 1, wherein the electrical fault comprises one of an open circuit, a short circuit, an out-of-range voltage, an out-of-range current, and a voltage shift.

3. The apparatus of claim 1, wherein the remedial action comprises one or more of reprogramming preamplifier registers, rewriting data multiple times, setting operational threshold windows, and adjusting operational threshold windows.

4. A system, comprising:
an energy source configured to heat a recording medium;
a read/write head comprising a sensor configured to detect whether the energy source is heating a recording medium during a write operation;
a preamplifier coupled to the energy source, the preamplifier configured to detect an electrical fault of the energy source; and
a controller coupled to the read/write head and the preamplifier, and configured to:
receive a first fault signal from the sensor indicating that the energy source is malfunctioning during the write operation and, in response to the first fault signal, take remedial action to protect data associated with the write operation; and
receive an electrical fault signal from the preamplifier and, in response to the electrical fault signal, take remedial action.

5. The system of claim 4, wherein the sensor comprises at least one of a photodiode and a temperature sensor.

6. The system of claim 4, wherein the remedial action comprises re-initiating the write operation with a following read verification.

7. The system of claim 4, wherein the first fault signal is triggered based on the energy source operating outside of a desired operating range and wherein the desired operating range is adjustable to prevent false indicators or to accommodate aging of the system.

8. The system of claim 4, wherein the electrical fault signal is triggered by one of an open circuit, a short circuit, an out-of-range voltage, an out-of-range current, and a voltage shift.

9. The system of claim 8, wherein the remedial action comprises one or more of reprogramming preamplifier registers, rewriting data multiple times, setting operational threshold windows, and adjusting operational threshold windows.

10. A method, comprising: monitoring an energy source used to heat a recording medium during a write operation; detecting an electrical fault of the energy source; issuing an electrical fault signal if an electrical fault occurs; and responding to the electrical fault signal to remediate the electrical fault, wherein the responding comprises protecting data associated with the write operation.

11. The method of claim 10, wherein the electrical fault signal is triggered by one of an open circuit, a short circuit, an out-of-range voltage, an out-of-range current, and a voltage shift.

12. The method of claim 10, wherein the remedial action comprises one or more of reprogramming preamplifier registers, rewriting data multiple times, setting operational threshold windows, and adjusting operational threshold windows.

* * * * *